US 8,790,821 B2

(12) United States Patent
Ito et al.

(10) Patent No.: US 8,790,821 B2
(45) Date of Patent: Jul. 29, 2014

(54) BATTERY

(75) Inventors: Syun Ito, Kyoto (JP); Yuu Shiraishi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 215 days.

(21) Appl. No.: 13/106,884

(22) Filed: May 13, 2011

(65) Prior Publication Data

US 2011/0281155 A1    Nov. 17, 2011

(30) Foreign Application Priority Data

May 17, 2010 (JP) ................... 2010-113283
Apr. 5, 2011 (JP) ................... 2011-083813

(51) Int. Cl.
*H01M 2/02* (2006.01)
*H01M 2/00* (2006.01)

(52) U.S. Cl.
USPC ........................... 429/181; 429/163; 429/178

(58) Field of Classification Search
USPC .................. 429/178–184, 161, 162, 170, 185
See application file for complete search history.

(56) References Cited

U.S. PATENT DOCUMENTS

| 4,215,187 | A | 7/1980 | Gnida et al. | |
| 7,807,285 | B1* | 10/2010 | Berg et al. | 429/97 |
| 2004/0265683 | A1 | 12/2004 | Merrill et al. | |
| 2006/0172192 | A1* | 8/2006 | Berkowitz et al. | 429/185 |

FOREIGN PATENT DOCUMENTS

| JP | 07-183024 | 7/1995 |
| JP | 2897104 | 5/1999 |
| JP | 2002-324541 | 11/2002 |
| JP | 2003-157812 | 5/2003 |
| JP | 2005-56649 | 3/2005 |
| JP | 2008-192552 | 8/2008 |
| JP | 2009-259524 | 11/2009 |
| JP | 2010-33766 | 2/2010 |

OTHER PUBLICATIONS

"Office Action of Korean Counterpart Application", issued on Feb. 17, 2013, p. 1-p. 4.
"Search Report of European Counterpart Application", issued on Sep. 7, 2011, p. 1-p. 6.

* cited by examiner

*Primary Examiner* — Muhammad Siddiquee
(74) *Attorney, Agent, or Firm* — Jianq Chyun IP Office

(57) ABSTRACT

The present invention provides a battery including a rivet either inserted into a through hole defined in a lid of a battery case with gaskets and interposed therebetween, the rivet connecting a current collector connected to a power generating element within the battery case and an external terminal. One end of the rivet in the axial direction is connected to the current collector, and provided with a tubular portion recessed in the axial direction, the tubular portion is defined in one of such manners that a bottom surface of the tubular portion reaches the lid of the battery case and that the bottom surface is positioned on a side of the other end beyond the lid of the battery case, and a thickness of the tubular portion increases from the one end toward the other end.

6 Claims, 7 Drawing Sheets

BATTERY

CROSS-REFERENCE TO RELATED APPLICATION

This application claims the priority benefit of Japan application serial no. 2010-113283, filed May 17, 2010 and the priority benefit of Japan application serial no. 2011-083813, filed Apr. 5, 2011. The entirety of each of the above-mentioned patent applications is hereby incorporated by reference herein and made a part of this specification.

BACKGROUND OF THE INVENTION

1. Field of the Invention

The present invention relates to a battery provided with a rivet and a method of manufacturing such a battery, in which the rivet is inserted through a through hole in a battery case with a gasket interposed therebetween.

2. Description of the Related Art

JP-A-2003-157812 shows that this battery is provided with a battery case main body that contains a power generating element, and a lid that covers an opening of the battery case main body. A solid rivet (rivet terminal) is inserted through a through hole in the lid with a gasket interposed therebetween. A current collector is disposed on an internal side of the lid such that one end in an axial direction of the rivet projects from a through hole of the current collector, subsequently the rivet is swaged on the one end, and whereby the current collector is fixed and the gasket is closely attached to the lid to seal between the lid and the rivet.

The detailed configuration of JP-A-2003-157812 described above is illustrated in FIG. 7A. FIG. 7A shows the battery upside down for swaging, in which a rivet 21 is provided to have one end in an arc shape spreading sideways by swaging the one end of the rivet 21, and a current collector 22 is fixed to a lid 26 with two gaskets 24 and 25 interposed therebetween. Further, at this time, by transmitting a pressure applied to the rivet 21 to the two gaskets 24 and 25, the gaskets 24 and 25 are closely attached to the lid 26, and whereby the lid 26 and the rivet 21 are sealed.

However, as a distance from the one end of the rivet 21 to a central portion 21A in the axial direction (a length of an arrow in FIG. 7A) is long and the applied pressure may not easily be transmitted to the central portion 21A of the rivet 21 in the axial direction, it is not possible to sufficiently expand a diameter of the central portion 21A of the rivet 21 in the axial direction. This prevents the other gasket 25 (an annular projection of the other gasket 25 inserted into a through hole 26A in the lid 26) from closely attaching to an inner periphery of the through hole 26A, and therefore it is often not possible to reliably seal around the through hole 26A.

FIG. 7B shows method of using a hollow rivet 27 to seal between the hollow rivet 27 and the lid 26. The hollow rivet 27 is provided with a pair of tubular portions 27A and 27B each having one end and the other end open, and a flange 27C disposed between the tubular portions 27A and 27B. The hollow rivet 27 fixes the current collector 22 and a terminal block (bus bar) 23 to the lid 26 with two gaskets 28 and 29 interposed therebetween by being placed on a pedestal 20 and swaged on the both ends. In addition, the rivet 27 causes the gaskets 28 and 29 to be closely attached to the lid 26 to seal between the lid 26 and the hollow rivet 27 (see FIG. 7(c)).

However, in this case, although the applied pressure is transmitted by swaging the one end of the hollow rivet 27 and a diameter of a central portion 27D of the hollow rivet 27 in the axial direction can be expanded, there is a problem that not only the force to expand the diameter is small, but the diameter of the central portion 27D in the axial direction that is once expanded can become smaller due to an elastic restoring force of a lower tubular portion 27A as the lower tubular portion 27A is hollow. Therefore, practically, it is not possible to cause the gasket 29 (an annular projection of the gasket 28 inserted into the through hole 26A in the lid 26) to closely attach to the inner periphery of the through hole 26A, and therefore it is often not possible to reliably seal around the through hole 26A. Moreover, as a thickness of the tubular portion 27A of the hollow rivet 27 is even and thin, there is a problem that a base portion of the tubular portion 27A can be fused when a high current flows through the hollow rivet 27.

SUMMARY OF THE INVENTION

An object of the present invention is to provide a battery capable of reliably sealing around a through hole of a battery case, and a method of manufacturing such a battery.

A first aspect of the present invention is to provide a battery comprising a battery case containing a power generating element therein and whose top surface is opened; a lid covering the top surface of the battery case, the lid having a through hole; a current collector connected to the power generating element; a rivet inserted into the through hole in the lid and connected to the current collector; a gasket interposed between the rivet and the battery case; and an external terminal connected to the rivet, in which a first end of the rivet in an axial direction is connected to the current collector and provided with a tubular portion recessed in the axial direction, a bottom surface of the tubular portion reaches the through hole of the lid or exceed the through hole from the first end toward a second end opposite to the first end in the axial direction, and a thickness of the tubular portion increases from the first end toward the second end.

A second aspect of the present invention is to provide a battery comprising a battery case containing a power generating element therein and whose top surface is opened; a lid covering the top surface of the battery case, the lid having a through hole; a current collector connected to the power generating element; a rivet inserted into the through hole in the lid and connected to the current collector; a gasket interposed between the rivet and the battery case, in which a first end of the rivet in an axial direction is connected to the current collector and provided with a tubular portion recessed in the axial direction, a bottom surface of the tubular portion reaches the through hole of the lid or exceed the through hole from the first end toward a second end opposite to the first end in the axial direction, a thickness of the tubular portion increases from the first end toward the second end, and the second end of the rivet serves as an external terminal.

A third aspect of the present invention provides a method of manufacturing a battery having; a battery case containing a power generating element therein and whose top surface is opened; a lid covering the top surface of the battery case, the lid having a through hole; a current collector connected to the power generating element, the current collector having a penetrating portion; a rivet inserted into the through hole in the lid and connected to the current collector and having a solid portion on a first end thereof in an axial direction, the first end of the rivet connected to the current collector; a gasket interposed between the rivet and the battery case, comprising: causing the solid portion to project from the penetrating portion the current collector; and forming a recessed tubular portion in the solid portion of the rivet, in which a bottom surface of the tubular portion reaches the through hole of the lid or exceed the through hole from the first end toward a second end opposite from the first end in the axial direction, and a thickness of the tubular portion increases from the first end toward the second end.

An fourth aspect of the invention is to provide a battery in which an external diameter of the tubular portion decreases from the one end toward the other end in the axial direction, and alternatively can be such that an inner diameter of the tubular portion decreases from the one end toward the other end in the axial direction.

A an fifth aspect of the invention is to provide a method of manufacturing a battery in which, the recessed tubular portion is provided by pushing a puncher into the solid portion of the rivet, and it is preferable to use a puncher including a tip end portion whose diameter is smaller than an external diameter of the rivet, or to use a puncher in a tapered shape, and it is also preferable that the external diameter of the solid portion of the rivet expands outward when providing the recessed tubular portion in the solid portion of the rivet.

BRIEF DESCRIPTION OF THE DRAWINGS

The foregoing and other features of the invention will become apparent to one skilled in the art to which the present invention relates upon consideration of the invention with reference to the accompanying drawings.

DETAILED DESCRIPTION OF THE INVENTION

A preferred embodiment of the present invention will be described hereinafter. A lithium battery (hereinafter simply referred to as the "battery") will be described as one example of a battery according to the present invention in detail with reference to the drawings.

Figure 1A:
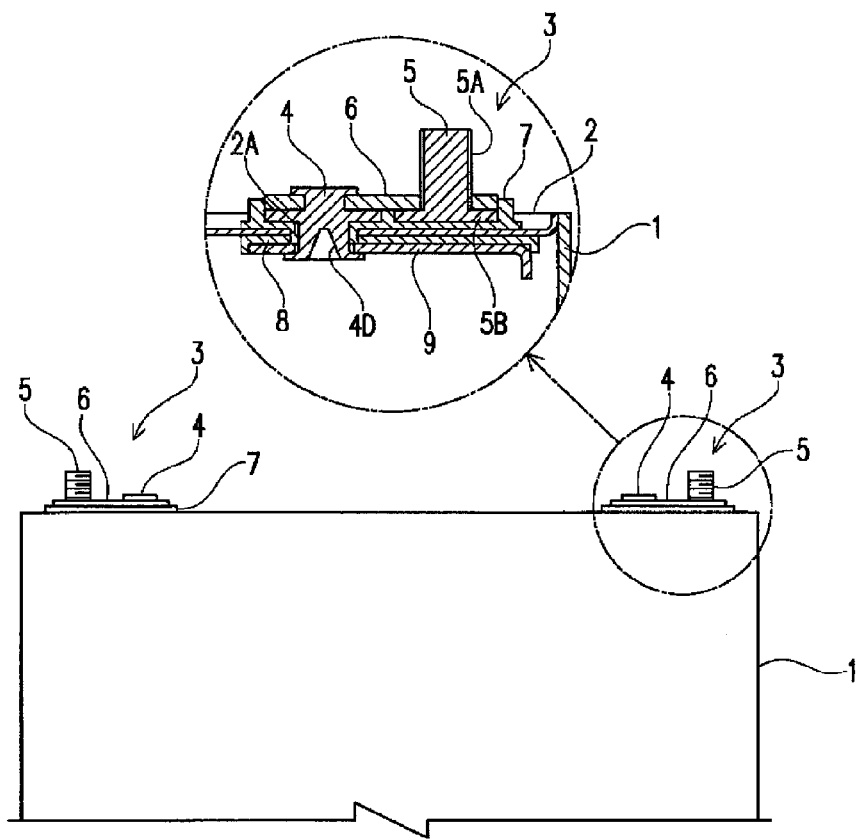
FIG. 1A is a front view of an upper portion of a battery.
Figure 1B:
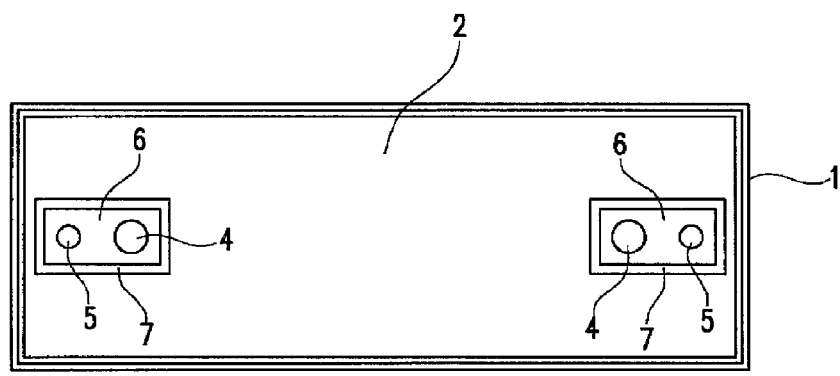
FIG. 1B is a plan view of the battery shown in FIG. 1A.

FIG. 1A and FIG. 1B illustrate the battery according to this embodiment. The battery is provided with a battery case main body 1 made of metal and having a substantially rectangular opening at its top end, a power generating element (not depicted) contained within the battery case main body 1, a lid 2 configured to cover an opening of the battery case main body 1, and terminal structures 3 and 3 disposed on both ends of the lid 2 in a longitudinal direction and fixed to a circular through hole 2A in a sealed state. It should be noted that the battery according to this embodiment can be utilized but not limited in an in-vehicle application such as a motorcycle or an automobile, and can be used for other purposes.

Figure 2A:
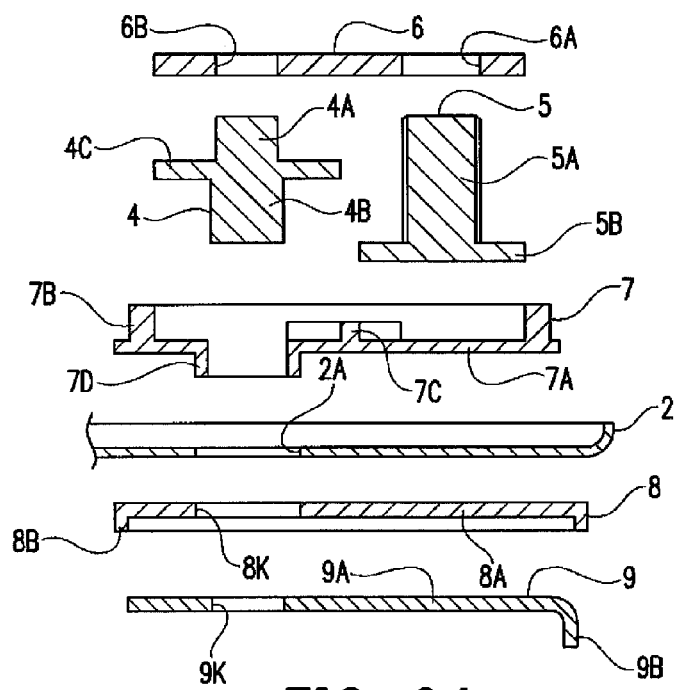
FIG. 2A is a longitudinal sectional front view illustrating a state before members constituting a terminal structure is assembled to a lid.

The terminal structures 3 and 3 have the same structure, and therefore only the one terminal structure 3 (the left one in the figure) will be described. Referring to FIG. 1A, FIG. 1B, and FIG. 2A, the terminal structure 3 is provided with a rivet 4 inserted through the through hole 2A of the lid 2 and swaged. An external terminal 5 is disposed at a predetermined distance from the rivet 4 in a longitudinal direction. A bus bar 6 configured to connect the rivet 4 and the external terminal 5. Two gaskets 7 and 8 for insulation configured to insulate the bus bar 6 and the rivet 4 from the lid 2, and a current collector 9 is connected to the rivet 4 and to the power generating element that is not depicted. Then, the terminal structures 3 and 3 are mounted to the lid 2, and the lid 2 is attached to the opening of the battery case main body 1 by such as welding. Further, an external terminal portion is configured by the bus bar 6 whose one end is connected to the rivet 4, and the external terminal 5 to which the other end of the bus bar 6 is connected.

The rivet 4 comprises a metal solid material, and configured as a solid rivet including columnar portions 4A and 4B that are disposed coaxially one above the other, a flange 4C disposed between the columnar portions 4A and 4B and projecting outward in a radial direction (circular in a planar view in this embodiment). While the columnar portion 4A on the upper side (corresponding to "the other end" in the present invention) is slightly shorter in an up-down direction than the columnar portion 4B (corresponding to a "solid portion" in the present invention) on the lower side (corresponding to "one end" in the present invention), the two columnar portions may have the same length. Further, while the lower columnar portion 4B has a diameter slightly larger than that of the upper columnar portion 4A, the diameter of the lower columnar portion 4B may be the same as that of the upper columnar portion 4A, or the diameter of the columnar portion 4A may be slightly larger than that of the lower columnar portion 4B. Here, while the rivet 4 is in a circular shape in accordance with a shape of the through hole 2A of the lid 2, it is not necessary to provide the shape of the rivet 4 in accordance with the shape of the through hole 2A.

The external terminal 5 is configured as a bolt-shaped member including a shaft portion 5A having threads along its outer periphery, and a head 5B disposed at one end of the shaft portion 5A and having a diameter larger than that of the shaft portion 5A. The external terminal 5 is fixed by inserting the shaft portion 5A into a through hole 6A in the bus bar 6, swaging the rivet 4 as will be described later, and pressing the head 5B against the gasket 7 with the bus bar 6 interposed therebetween.

The bus bar 6 is configured as a substantially rectangular plate member comprising metal, and includes the through hole 6A on one end into which the shaft portion 5A can be inserted, and a through hole 6B on the other end into which (the upper columnar portion 4A of) the rivet 4 can be inserted.

The one gasket 7 (the gasket for external insulation) is provided by molding a resin such as polypropylene or polyethylene (or may be rubber), and includes a plated main body portion 7A in a substantially rectangular shape in a planar view, a vertical wall portion 7B projecting upward from an outer peripheral rim of the main body portion 7A and for positioning the bus bar 6, a protrusion 7C disposed at a substantial center of the gasket 7 in a longitudinal direction and for positioning the rivet 4 and the external terminal 5 in the longitudinal direction of the gasket 7, and a cylindrical annular projection 7D that is fitted into the lower columnar portion 4B of the rivet 4.

Similarly, the other gasket 8 (the gasket for internal insulation) is also provided by molding a resin such as polypropylene or polyethylene (or may be rubber), and includes a plated main body portion 8A in a substantially rectangular shape in a planar view, and a projection 8B projecting downward from an outer peripheral rim of the main body portion 8A and for positioning the current collector 9 in a horizontal direction. Further, a through hole 8K having the same size as the through hole 2A of the lid 2 is formed in the main body portion 8A of the gasket 8 on a side of the rivet 4.

The current collector 9 comprises a metallic material, and includes a plated main body portion 9A in a substantially rectangular shape in a planar view, and a bent portion 9B that is directed downward substantially at 90 degrees from one end of the main body portion 9A. Further, a through hole 9K through which the lower columnar portion 4B of the rivet 4 can be inserted is defined in the main body portion 9A on a side of the rivet 4.

The structure of the battery according to this embodiment is as described above. Next, there will be described a method of fixing the external terminal 5, the bus bar 6, and the current collector 9 as a whole to the lid 2 with the gaskets 7 and 8 interposed therebetween by swaging the rivet 4.

First, as shown in FIG. 2A, the upper gasket 7 is disposed above the lid 2 such that the annular projection 7D of the upper gasket 7 is inserted through the through hole 2A of the lid 2. And above the gasket 7, the external terminal 5 is disposed at an outward side of the gasket 7 in the longitudinal direction and the rivet 4 is disposed at an inward side of the gasket 7 in the longitudinal direction such that the lower columnar portion 4B is inserted into the annular projection 7D of the gasket 7. In this state, the bus bar 6 is disposed such that (the shaft portion 5A of) the external terminal 5 is inserted into the one through hole 6A, and the upper columnar portion 4A of the rivet 4 is inserted into the other through hole 6B (see FIG. 2B).

Subsequently, under the lid 2, the lower gasket 8 is disposed such that the through hole 8K of the lower gasket 8 fits around the annular projection 7D of the upper gasket 7. Then, in this state, the current collector 9 is disposed such that the through hole 9K of the current collector 9 fits around the lower columnar portion 4B of the rivet 4 (see FIG. 2B).

After all the members are assembled to the lid 2 in this manner, the lid 2 is turned upside down (see FIG. 2C), the columnar portion 4B of the rivet 4 is swaged from above in a state in which a side of the columnar portion 4F of the rivet 4 is placed on a pedestal 11, and whereby all of the members 5, 6, and 9 are fixed to the lid 2 with the gaskets 7 and 8 interposed therebetween. Specifically, a puncher 10 having a tip end portion 10A whose diameter is smaller than an external diameter of the rivet 4 is pushed from above into a central portion of the rivet 4 (may be displaced from the central portion) to push the central portion of the rivet 4 into the lid 2.

Figure 2B:
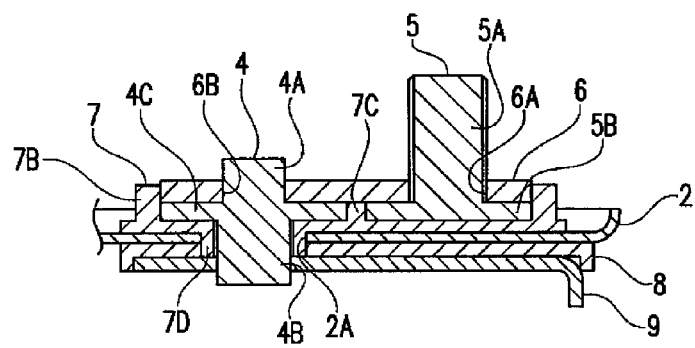
FIG. 2B is a longitudinal sectional front view illustrating a state in which the members constituting the terminal structure has been assembled to the lid.
Figure 2C:
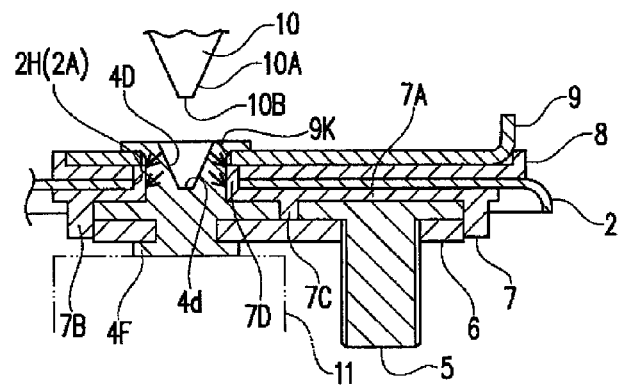
FIG. 2C is a longitudinal sectional front view illustrating a state in which the members constituting the terminal structure is fixed to the lid by pushing a puncher in a rivet.

As it is possible to move a position at which a pressure applied by the pushing-in (see arrows in FIG. 2C and FIG. 3A) acts closer to the lid 2, the rivet 4 expands by an amount that has been pushed in a direction perpendicular to the axial direction. Then, as the expanded portion presses the annular projection 7D of the gasket 7 against an inner periphery 2H of the through hole 2A of the lid 2, the annular projection of the gasket 7 is closely attached to the inner periphery 2H of the through hole 2A to seal around the through hole 2A of the lid 2. Here, FIG. 2B shows a gap between an inner periphery of the annular projection 7D of the gasket 7 and an outer periphery of the columnar portion 4B of the rivet 4, for clear illustration of transition from FIG. 2B to FIG. 2C. However, in practice, there is either no gap or a very small gap by making an inner diameter of the annular projection 7D of the gasket 7 to be the same or substantially the same as the external diameter of the columnar portion 4B of the rivet 4.

The puncher 10 is configured in a conical shape that is tapered to its tip end (pointed shape), and a tip end face 10B thereof is flat. Therefore, an end surface of the rivet 4 on a side of the power generating element after the swaging is provided with a recessed tubular portion 4D whose inner diameter decreases toward its back. Thus, the end surface of the rivet 4 on the side of the power generating element is provided with the recessed tubular portion 4D that becomes thicker toward its back. Further, if a degree of deformation of the rivet 4 by the puncher 10 is large, as shown in FIG. 3B, the recessed tubular portion 4D whose external shape increases toward its tip end (the external diameter decreases toward its back) is provided. In this case, as a rate of change of the external diameter is smaller than that of the inner diameter, the side becomes thicker toward its back. Here, in order to increase a force of pressing the annular projection 7D of the gasket 7 against the inner periphery 2H of the through hole 2A of the lid 2 (pressing force), a position of a bottom surface 4d of the tubular portion 4D is preferably positioned within the annular projection 7D of the gasket 7 from the opening of the annular projection 7D, that is, it is preferable to push the puncher 10 in so that the position of the bottom surface 4d of the tubular portion 4D reaches the through hole 2A of the lid 2. In addition, by further pushing the puncher 10 in so as to position the bottom surface 4d of the tubular portion 4D on the other end in the axial direction beyond the lid 2, such as in a case in which the position of the bottom surface 4d of the tubular portion 4D reaches or exceeds the top end of the main body portion 7A of the gasket 7, it is possible to press the annular projection 7D of the gasket 7 more firmly against the inner periphery 2H of the through hole 2A of the lid 2.

Moreover, by using a puncher different from the puncher 10, or by a leveled end surface provided at a base portion of the cone of the puncher 10 that is not depicted, the (less thick) tip end side of the tubular portion 4D of the rivet 4 is provided such that the portion projecting from the through hole 9K of the current collector 9 expands outward in a radial direction so as to have a diameter larger than that of the through hole 9K of the current collector 9 in a state of closely attaching to the inner periphery of the through hole 9K of the current collector 9, and presses the current collector 9 against the lid 2 to reliably fix the current collector 9 to the lid 2. On the other hand, by being flattened by a reactive force from the pedestal 11, the other side of the rivet 4 that expands outward in a radial direction is provided with a flange 4F having a diameter larger than that of the through hole 6B of the bus bar 6, thereby pressing the bus bar 6 against the lid 2 to reliably fix the bus bar 6 to the lid 2.

Figure 7A:
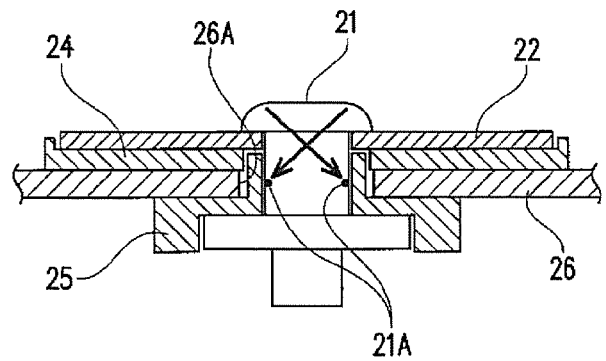
FIG. 7A is a longitudinal sectional side view illustrating a conventional method of fixation of the rivet.
Figure 7B:
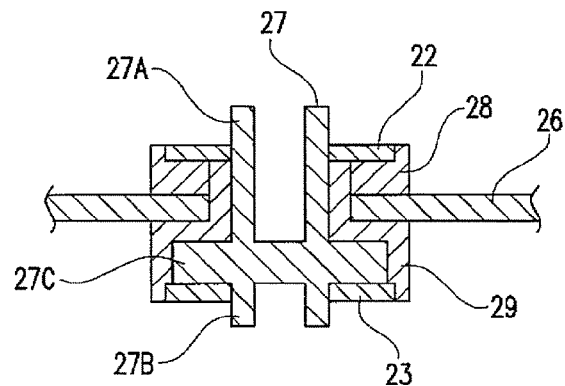
FIG. 7B is a longitudinal sectional side view illustrating a conventional method of fixation of the rivet.

As described above, according to this embodiment, when swaging the rivet 4 by pushing the pointed puncher 10 into the rivet 4, the size of the rivet 4 in the axial direction can be made smaller than the case of swaging by crushing the one end as shown in FIGS. 7A and 7B. Thereby, it is possible to decrease space. In other words, while the crushed portion is present along the axial direction of the rivet 4 in FIGS. 7A and 7B, such a crushed portion is not present along the axial direction of the rivet 4 in this embodiment as being only pushed instead of being crushed, and thus, it is possible to make the rivet 4 shorter by this amount.

In addition, according to this embodiment, it is possible to exert the force for expanding the rivet 4 in the direction perpendicular to the axial direction (outward in the radial direction) by pushing as compared to the conventional example. Accordingly, it is advantageously possible to increase the range of the push-in force (applied pressure) of the puncher 10 required for reliably sealing between the lid 2 and the rivet 4 (more specifically, around the through hole 2A of the lid 2).

Figure 7C:
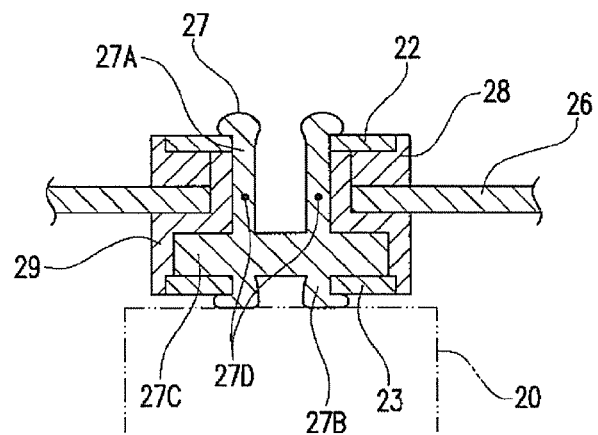
FIG. 7C is a longitudinal sectional side view illustrating a conventional method of fixation of the rivet.

Further, according to this embodiment, by swaging the both ends of the rivet 4 such that the one end of the rivet 4 is configured as the recessed tubular portion 4D that becomes thicker toward the other end, it is possible to more effectively suppress elastic restoration of the rivet 4 that has been deformed along with the swaging as compared to the rivet 27 shown in FIG. 7B and FIG. 7C. Accordingly, the force (pressing force) pressing the annular projection 7D of the gasket 7 against the inner periphery 2H of the through hole 2A of the lid 2 can be maintained, and therefore, it is possible to reliably maintain the sealed state between the lid 2 and the rivet 4 (more specifically, around the through hole 2A of the lid 2).

In addition, in FIG. 7B and FIG. 7C, there is a problem that a base portion of the tubular portion 27A can be fused when a high current flows through the rivet 27 for some reason as the thickness of the tubular portion 27A of the rivet 27 is even and thin. According to this present embodiment, as a current path through the rivet 4 becomes wider and a current can easily flow as the tubular portion 4D is thicker toward its back, such a problem does not occur.

In the meantime, if the thickness of the tubular portion 27A of the rivet 27 shown in FIGS. 7B and C is not thin (thick), there may be no possibility that the base portion of the tubular portion 27A is fused. However, even when compared to this example, the rivet 4 according to this embodiment is highly airtight with (the annular projection 7D of) the gasket 7, as well as light weighted.

Figure 3A:
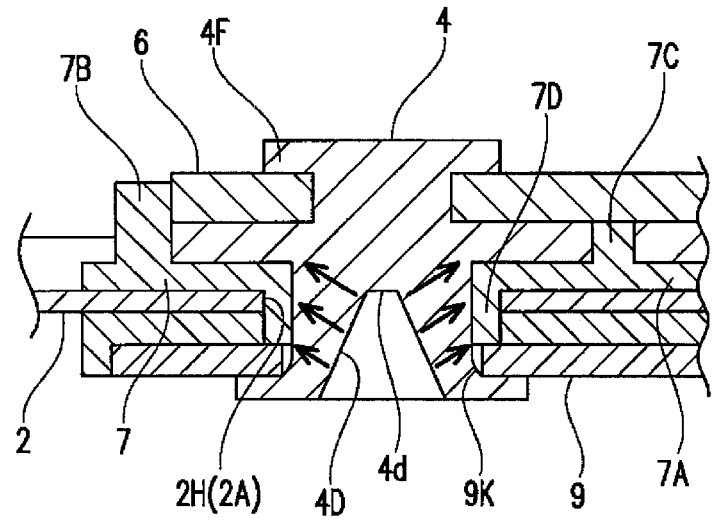
FIG. 3A is a longitudinal sectional front view illustrating the vicinity of the rivet shown in FIG. 1A.
Figure 3B:
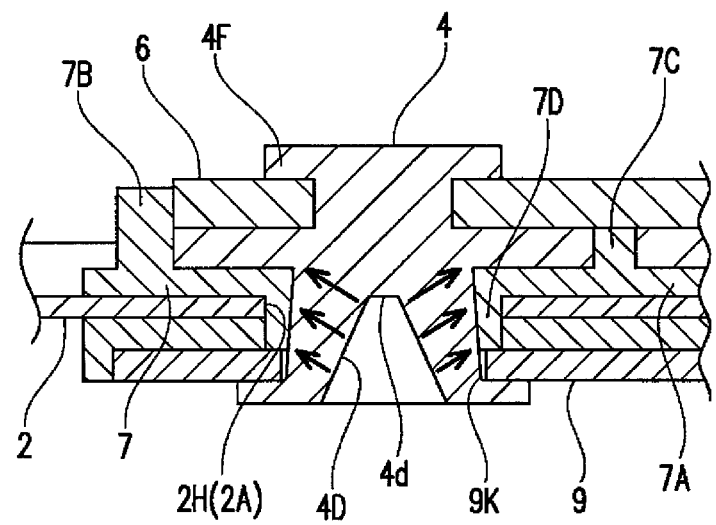
FIG. 3B is a longitudinal sectional front view illustrating a state in which an external diameter of the rivet decreases from one end to the other end in its axial direction.

Further, compressing the annular projection 7D of the gasket 7 more strongly than other portions can cause the gasket 7 to slightly come between the current collector 9 and the lid 2 as shown in FIGS. 3A and B. Therefore it is possible to reliably seal between the current collector 9 and the lid 2.

It should be noted that the present invention is no way limited by the above embodiment, and various modifications can be made without departing the spirit and scope of the present invention.

Figure 4A:
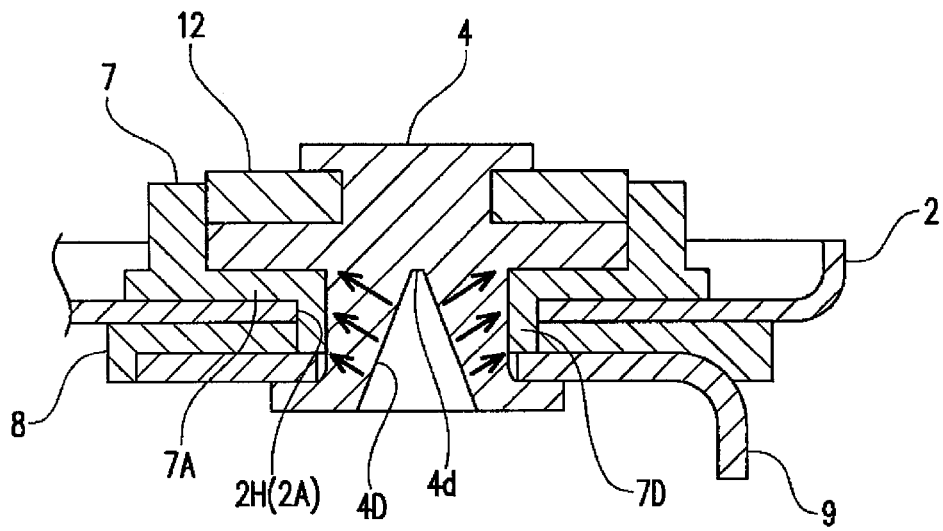
FIG. 4A is a longitudinal sectional front view illustrating a configuration in which a portion of the rivet is configured as the external terminal.
Figure 4B:
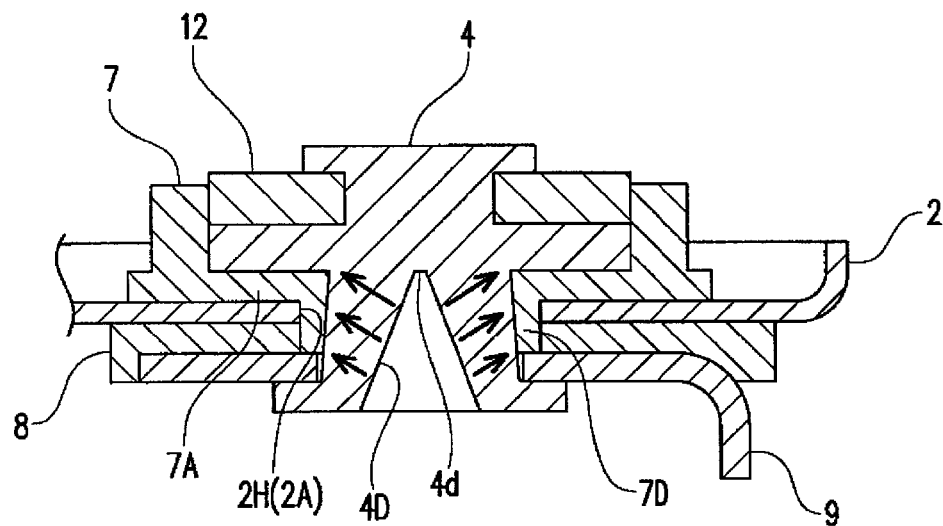
FIG. 4B is a longitudinal sectional front view illustrating a state in which the external diameter of the rivet decreases from one end to the other end in its axial direction.

For example, in the above embodiment, the external terminal portion is configured by connecting the external terminal 5 and the rivet 4 via the bus bar 6. However, as shown in FIG. 4A and FIG. 4B, it is possible to employ a structure in which the rivet 4 also serves as the external terminal, that is, the other end of the rivet 4 constitutes the external terminal. In this case, instead of the bus bar, a terminal block 12 made of metal is fixed to the rivet 4. For the rest of the other configuration, the members of the same types are provided other than that the sizes are shorter due to the elimination of the external terminal 5 shown in FIG. 1. Here, FIG. 4B shows the rivet 4 with a different external diameter, similarly to FIG. 3B.

Figure 5A:
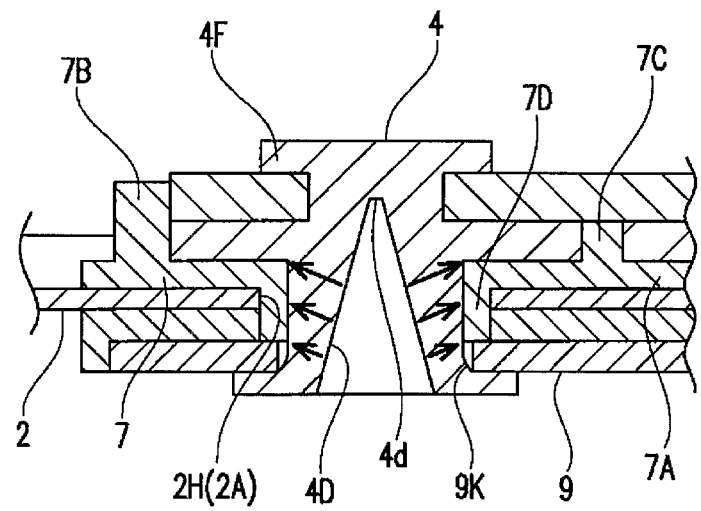
FIG. 5A is a longitudinal sectional front view illustrating a state in which a punching hole is defined to be deeper than that shown in FIG. 3A.
Figure 5B:
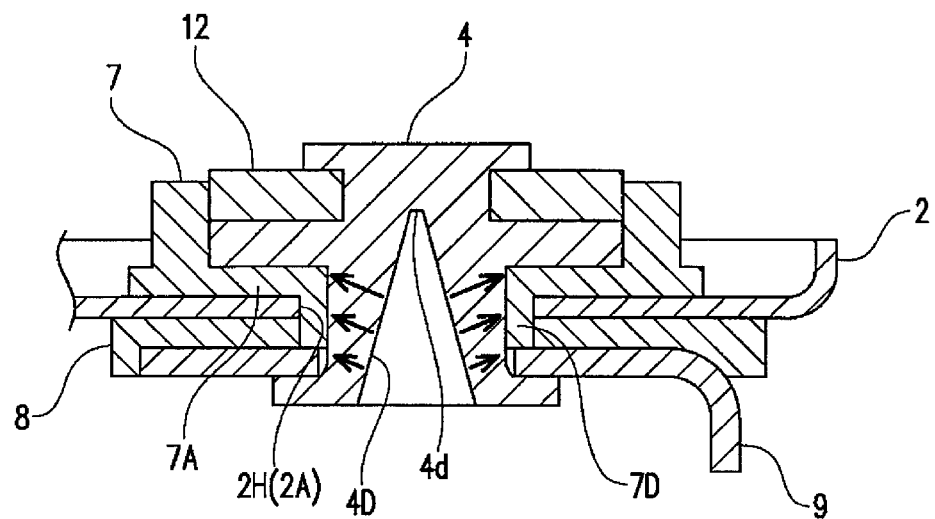
FIG. 5B is a longitudinal sectional front view illustrating a state in which a punching hole is defined to be deeper than that shown in FIG. 4A.

Further, in the above embodiment, the tip end of the puncher 10 is pushed in so that it reaches the through hole 2A of the lid 2. However, by pushing the puncher 10 so as to reach a top end of the main body portion 7A of the upper gasket 7 as shown in FIG. 4A and FIG. 4B, or even further as shown in FIG. 5A and FIG. 5B, the position at which the applied pressure acts (see the arrows in FIG. 4A, FIG. 4B, FIG. 5A, and FIG. 5B) can be moved toward the other end beyond the lid 2 as compared to the example shown in FIG. 3A and FIG. 3B. This allows the annular projection 7D of the gasket 7 to be even more firmly pressed against the inner periphery 2H of the through hole 2A of the lid 2.

Figure 6A:
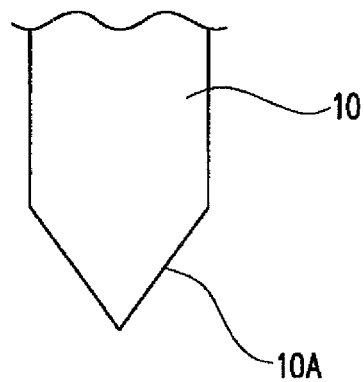
FIG. 6A is a side view illustrating another shape of the puncher.
Figure 6B:
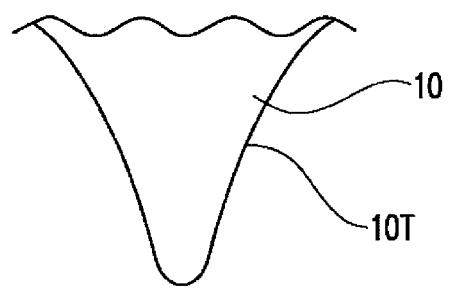
FIG. 6B is a side view illustrating yet another shape of the puncher.

Moreover, in the above embodiment, the puncher 10 that is in a conical shape as a whole is used. However, as shown in FIG. 6A, the puncher 10 may be a conical shape in which only the tip end portion 10A has a tapered surface. Alternatively, as shown in FIG. 6B, a tapered surface 10T may be a curved surface that is recessed toward an axial core. In addition, by making the puncher in a tapered shape, the tubular portion 4D is also tapered toward bottom as shown in FIG. 3A, FIG. 3B, FIG. 4A, and FIG. 4B. However, it is possible to swage the rivet 4 by using a puncher having a substantially even diameter. In this case, the diameter of the recessed portion provided in the rivet is substantially even from top to bottom.

Furthermore, in the above embodiment, the puncher is pushed into the lower portion of the rivet 4 (a side of the battery case). However, the puncher may be pushed into the top end portion of the rivet 4 (an external side of the battery case).

Further, in the above embodiment, the battery case is configured by the battery case main body 1 that contains the power generating element and the lid 2 that covers the opening of the battery case main body 1. However, the battery case may be configured such that the through hole for inserting the rivet 4 is provided in the battery case main body 1 and the external terminal 5, the bus bar 6, and the current collector 9 are integrally fixed to the battery case main body 1 with the gaskets 7 and 8 interposed therebetween.

Moreover, in the above embodiment, the one gasket 7 (the gasket for external insulation) is provided with the annular projection 7D inserted into the through hole 2A of the lid 2, and the annular projection 7D is closely attached to the inner periphery of the through hole 2A of the lid 2 along with the expansion of the rivet 4 (expansion of the diameter). However, the annular projection may be provided for the other gasket 8. In this case, as a configuration in which the base portion of the annular projection is on the other end of the rivet 4 and the opening of the annular projection is on the one end of the rivet 4 is more effective for closely attaching the annular projection to the inner periphery of the through hole 2A, it is preferable that the annular projection is provided for the gasket 7 on a side opposite from a side of pushing the puncher 10.

Furthermore, in the above embodiment, the through hole 9K is provided for the current collector 9, and the columnar portion 4B of the rivet 4 is inserted into the through hole 9K. However, a cut-out or the like may be provided for the current collector 9 instead of the hole.

As described above, according to one aspect and the process of the present invention, by pushing the puncher, for example, into the one end of the rivet inserted into the through hole defined in the battery case to push the one end of the solid portion of the rivet from the one end into the other end in the axial direction, (a central portion in the axial direction of) the rivet expands in a direction perpendicular to the axial direction by an amount that has been pushed. Therefore, it is possible to reliably seal around the through hole of the battery case.

According to the present invention, as it is possible to move a position at which an applied pressure acts closer to the lid, by pushing the one end of the solid portion from the one end into the other end in the axial direction when swaging the rivet using a pointed puncher, for example, (a central portion in the axial direction of) the rivet reliably expands in a direction perpendicular to the axial direction by an amount that has been pushed. Therefore, the gaskets are reliably and closely attached to the inner periphery of the through hole of the lid, thereby sealing around the through hole. In addition, as being made of a solid material, once the rivet has deformed, it is insusceptible to elastic restoration (it is not easy to bring the deformation back to the original state), and it is possible to reliably maintain the sealed state around the through hole of the battery case.

In addition, according to one aspect and the process of the present invention, by providing the one end of the rivet with the tubular portion whose bottom surface either reaches the lid, or is positioned on the side of the other end in the axial direction beyond the lid, it is possible to reliably move the position at which the applied pressure acts closer to the battery case. Moreover, by providing the one end of the rivet with the tubular portion whose thickness increases from the one end to the other end in the axial direction, it is possible to effectively suppress the elastic restoration of the rivet that has been deformed by the calking. In addition, as a current path in the rivet increases and a current can flow easily, a problem of fusing a base portion of the tubular portion may not occur even when a high current flows through the rivet.

Further, according to one aspect and the process of the present invention, by providing the one end of the rivet with the recessed tubular portion whose thickness increases from the one end to the other end in the axial direction, it is possible to effectively suppress the elastic restoration of the rivet that has been deformed by swaging, thereby reliably maintaining the sealed state around the through hole of the battery case. In addition, as a current path in the rivet increases and a current can flow easily, it is possible to effectively prevent the base portion of the tubular portion from being fused, even when a high current flows through the rivet for some reason.

What is claimed is:

1. A battery comprising:
a battery case containing a power generating element therein and whose top surface is opened;
a lid covering the top surface of the battery case, the lid having a through hole;
a current collector connected to the power generating element;
a rivet inserted into the through hole in the lid and connected to the current collector;
a gasket interposed between the rivet and the battery case; and
an external terminal connected to the rivet,
wherein a first end of the rivet in an axial direction is connected to the current collector and provided with a tubular portion having outer and inner surfaces, the inner surface defining a recess recessed in the axial direction,
a bottom surface of the recess reaches the through hole of the lid or exceeds the through hole toward a second end opposite from the first end in the axial direction,
a thickness between the outer and inner surfaces continuously increases from the first end toward the second end, and
an external diameter of the tubular portion decreases continuously from the first end toward the second end, wherein a rate of the increase of the thickness is greater than that of the decrease of the external diameter.

2. A battery comprising:
a battery case containing a power generating element therein and whose top surface is opened;
a lid covering the top surface of the battery case, the lid having a through hole;
a current collector connected to the power generating element;
a rivet inserted into the through hole in the lid and connected to the current collector; and
a gasket interposed between the rivet and the battery case,
wherein a first end of the rivet in an axial direction is connected to the current collector and provided with a tubular portion having outer and inner surfaces, the inner surface defining a recess recessed in the axial direction,
a bottom surface of the recess reaches the through hole of the lid or exceeds the through hole toward a second end opposite from the first end in the axial direction,
a thickness between the outer and inner surfaces continuously increases from the first end toward the second end,
the second end of the rivet serves as an external terminal, and
an external diameter of the tubular portion decreases continuously from the first end toward the second end, wherein a rate of the increase of the thickness is greater than that of the decrease of the external diameter.

3. The battery according to claim 1, wherein:
an inner diameter of the tubular portion decreases from the first end toward the second end in the axial direction.

4. The battery according to claim 2, wherein:
an inner diameter of the tubular portion decreases from the first end toward the second end in the axial direction.

5. The battery according to claim 1, wherein the first end of the rivet is provided with a swaged flange that is brought into direct contact with the current collector.

6. The battery according to claim 2, wherein the first end of the rivet is provided with a swaged flange that is brought into direct contact with the current collector.

* * * * *